Jan. 5, 1954  F. J. LANDGRAF ET AL  2,665,389
SYNCHRONOUS ELECTRIC CLOCK MOTOR
Filed Jan. 16, 1952
2 Sheets-Sheet 2
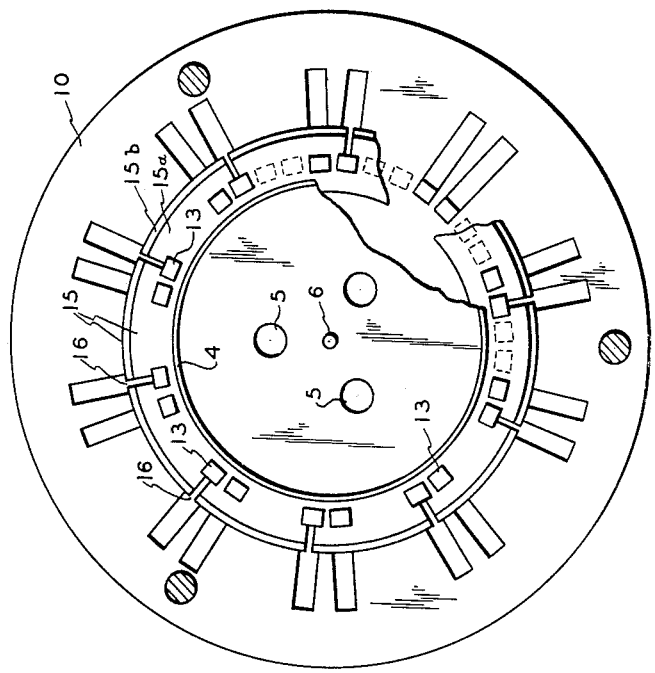
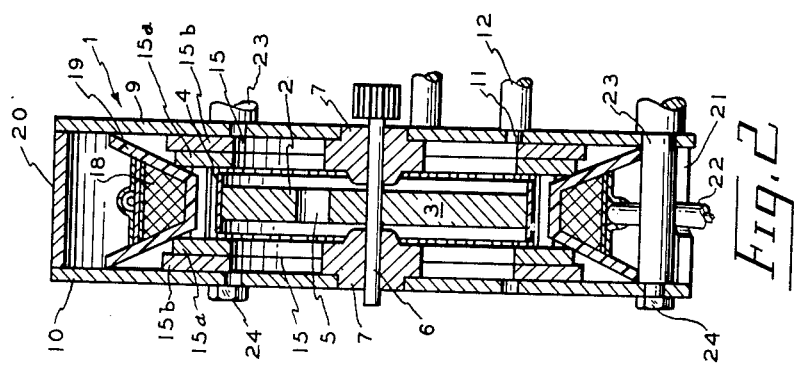
INVENTORS
FRANCIS J. LANDGRAF
& RICHARD P. LANDGRAF
BY *Elton H. Brown, Jr.*
AGENT Patented Jan. 5, 1954

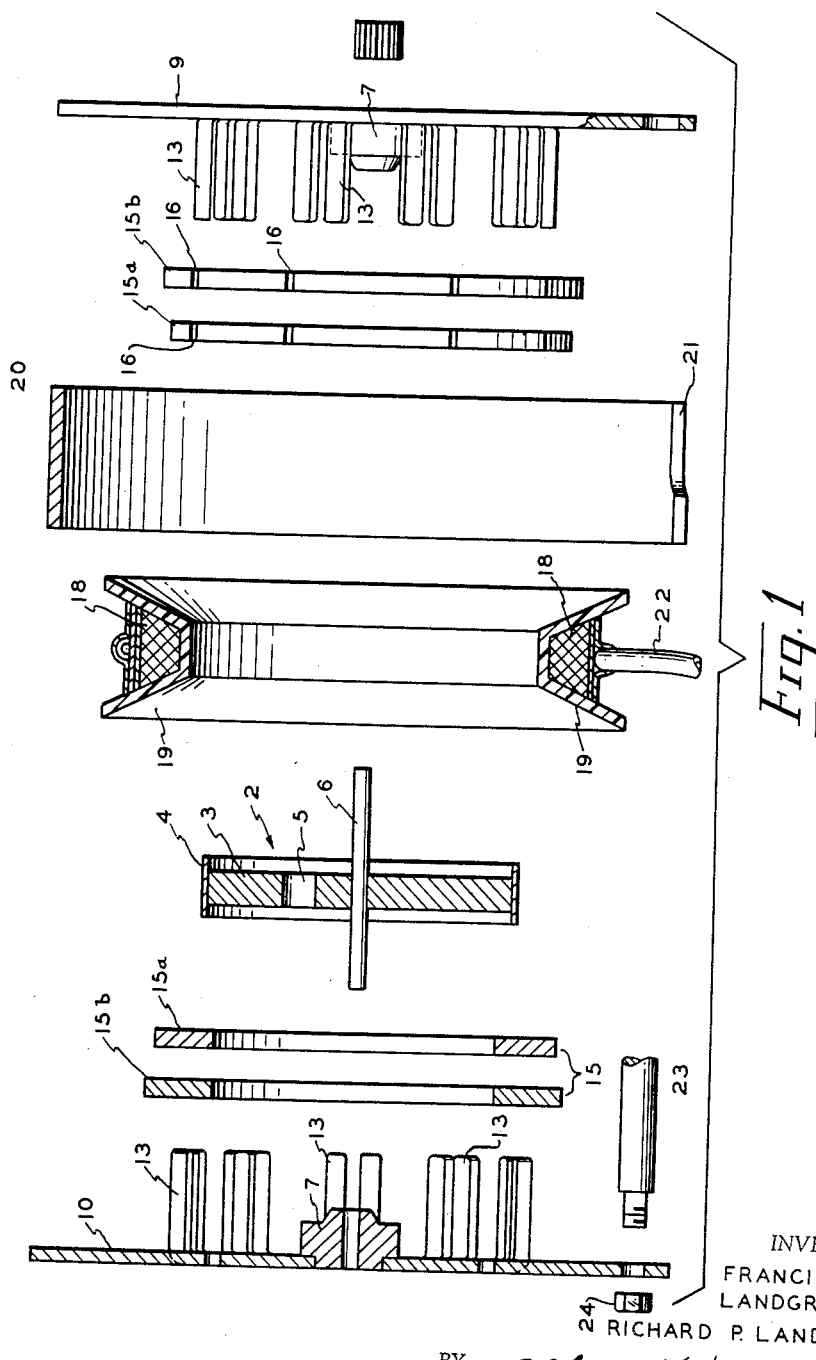

2,665,389

UNITED STATES PATENT OFFICE 2,665,389

SYNCHRONOUS ELECTRIC CLOCK MOTOR

Francis J. Landgraf and Richard P. Landgraf, Chicago, Ill.

Application January 16, 1952, Serial No. 266,726

1 Claim. (Cl. 310—164)

The present invention relates generally to shaded pole electric motors of the synchronous type, employing hysteresis type motors.

It is a primary object of the invention to provide a novel motor of the class indicated which is capable of particularly economical production, is rugged and compact, and possesses good operating characteristics.

It is a more particular object of the invention to provide a novel motor of the class indicated which is fabricated of a minimum number of simple parts.

It is a further object of the invention to provide a motor of the class indicated having highly concentrated field flux for the number of ampere turns of field winding employed, by virtue of employment of a field winding coaxial with the rotor, and having a tapering cross section.

It is another object of the invention to provide a novel motor of the class indicated in which the parts of the motor involve no metal drawing operations, but may be stamped or die pressed.

Still a further object of the invention resides in the provision of a motor of the class indicated in which one of the pole plates is provided with bearings for gear shafts of an electric clock or the like, thereby reducing the overall expense of including the motor in an electric clock.

Still another object of the invention resides in the provision of an electric motor of the type indicated in which pole pieces are formed integrally with the pole plates, and in which shading rings are pressed over the pole pieces inwardly of the pole plates, the ring field winding being tapered to have a width such that its outmost width forms a spacer for the pole plates, while its inner width clears the shading rings.

Still further objects, features, and advantages of the invention will become apparent upon consideration of the following detailed description of one specific embodiment of a motor constructed in accordance with the invention, especially when taken in conjunction with the accompanying drawings, wherein:

Figure 1 is an explosion of a motor constructed and arranged in accordance with the present invention;

Figure 2 is a traverse section of a motor of Figure 1 assembled; and

Figure 3 is a view in elevation of some of the elements of the motor of Figure 1 in assembled relation.

Referring now more particularly to the drawings the reference numeral 1 indicates generally a motor, of the self-starting shaded pole synchronous type, employing a hysteresis type rotor 2, consisting of a disc 3 of aluminum or other light non-magnetic material, the latter being provided with a thin rim fabricated of steel having high remanence. The rim 4 may be of slightly greater width than the disc 3, and the latter may be provided with a plurality of symmetrically distributed apertures 5. The disc 3 is force fitted to a central motor shaft or arbor 6, which is, in the assembled motor, journaled in bearings 7. The bearings 7 are force fitted into disc-like pole plates 9, 10, die formed of steel. The pole plate 10 is provided with bearing apertures, as 11, to receive the ends of shafts or arbors, as 12, which support the gears and pinions of a clock (not shown), thereby reducing the total number of parts required in a clock assembly.

Pole fingers 13 are die formed integrally with the pole plates, in adjacent pairs, there being in all ten pairs of pole fingers formed from each plate, and each pair providing one field pole electrically. The spacing of the pole finger pairs is so arranged that the pole finger pairs deriving from the separate pole plates intermesh, and the pair of pole plates to be assembled into a single motor may be identical generally, except for the presence of the bearing apertures 11 in one pole plate, which are not required in the other.

A separate pair of shading rings 15 is provided, apertured for force fitting over the pole fingers 13 of each pole plate and lying flush against the pole plate. A radial slit 16 is provided in the shading rings for one of each pair of pole fingers, the slits being equally spaced about the shading rings 15. The latter may be die formed from sheet copper or other non-magnetic material having the requisite electrical conductivity. Accordingly, the pole fingers 13 afford reinforcement for the shading rings 15, and the rings 15, being rigid, support and retain the spacing of the pole fingers, forming a rigid, yet easily assembled whole. By reason of the slits 16 an electrical circuit is established through the rings about alternate ones only of the pole fingers, and in consequence half the effective area of each pole, comprised of a pair of adjacent pole fingers, is shaded and half unshaded.

A similar shading ring arrangement is provided for each of the pole plates, with the difference that locations of the slits 16 are such that if the counterclockwise fingers of each pair are shaded on one pole face, the clockwise fingers are shaded on the other, when similarly viewed. In consequence when the pole faces are assembled, the sense of shading is identical for both, and effectively 20 similar shaded poles are provided, the pole fingers of which are all equally spaced circumferentially.

A field winding 18 is wound in a tapered plastic shell 19, wider at greater radius. The maximum width of the shell 19 is such that the shell forms a spacer for the pole plates 13, or is clamped therebetween, retaining the ends of the pole fingers just out of contact with the shading rings. A further spacing member is provided by the outer steel closure ring 20, which has the same width as the maximum width of the shell 19.

The closure ring 20 is split along its width, and provided with an aperture 21, straddling the split, to enable emergence of the lead 22 used for conveying electronic current to the field winding 18.

The pole plates 9, 10, are clamped by means of bolts 23, having threaded ends of reduced diameter, to which are threadedly secured nuts, as 24. When secured the closure ring 20, and the shell 19, which contains and supports the field winding 18, are firmly clamped between the pole plates 9, 10, and all the parts are properly spaced and positioned for operation of the motor.

The shell 19 tapers or narrows, to its inner diameter, the latter having about the same width as the rotor rim 4, so that the magnetic flux produced by the field winding 18 is concentrated on the rim. At the same time the inner diameter of the shell 19 fits snugly about the field fingers, and aligns these annularly. Each shading ring is made up of two annular shading plates, 15a, 15b, generally similar, but with the inner one of the two, 15a, of reduced outer diameter, so that each shading ring 15, taken as a unit, tapers. The taper and spacing of the shading rings are such so that the shell 19 secures the inner shading plates, 15a, firmly against the outer shading plates, 15b, and hence against the respective inner pole plates 10 and 11, and the inner shading plates 15a in turn clamp the shell 19, thus forming an extremely rigid, yet simple, structure. By virtue of the tapered arrangement of the field shell 19, and of the spacing and dimensioning of the shading rings 15, maximum utilization of space is accomplished, together with positive interlocking of parts, whereby the assembled rotor is rigid and compact, yet fabricated of a minimum number of simple parts susceptible of die pressing.

While we have described one specific embodiment of our invention it will be clear that variations of construction may be resorted to without departing from the true scope of the claim as defined in the appended claim.

We claim:

In an electric motor of the self-starting single phase hysteresis type, a pair of flat disc shaped field plates, each of said plates having a plurality of pairs of integral projections bent in one direction at right angles to each of said plates, and at a fixed mean radius from the center of said plates, the projections of each of said plates all terminating in a common plane parallel with the plane of the field plates, a cylindrical rotor having a highly remanent rim, said rotor having a shaft coaxial therewith, bearings for said shaft fitted in central apertures of said field plates, a separate shading ring secured to each of said field plates and each force fitted over all the projections of its field plate, said shading rings having a greater outer radius and a smaller inner radius than the radius of said projections, a cylindrical field winding coaxial with said field plates, and having a uniformly tapered cross section, a correspondingly tapered cylindrical plastic support for said field winding, said support having an inner diameter equal to the outer diameter of said projections and retaining said annular fingers in annular relation and a width at the inner diameter substantially equal to the width of said rim, said support having a width at its outer diameter equal to the desired spacing of said field plates in the assembled condition of said motor, an enclosing metal ring located between said field plates, and means for holding said field plates together in clamping relation to said metal ring, to said support in its outer diameter, and to said shading rings and said support taken at a point along its taper.

FRANCIS J. LANDGRAF.
RICHARD P. LANDGRAF.

References Cited in the file of this patent

UNITED STATES PATENTS

| Number | Name | Date |
| --- | --- | --- |
| 1,959,391 | Spencer | May 22, 1934 |
| 2,237,960 | Hansen et al. | Apr. 8, 1941 |
| 2,248,285 | Reinhardt | July 8, 1941 |
| 2,382,333 | Poole | Aug. 14, 1945 |
| 2,432,070 | Sanborn | Dec. 2, 1947 |
| 2,437,201 | Landgraf et al. | Mar. 2, 1948 |